United States Patent
Stanger

(10) Patent No.: US 11,933,981 B2
(45) Date of Patent: Mar. 19, 2024

(54) HEADS-UP DISPLAY UNIT WITH INTEGRATED PROTECTION SYSTEM

(71) Applicant: Honda Motor Co., Ltd., Tokyo (JP)

(72) Inventor: Andrew M. Stanger, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 640 days.

(21) Appl. No.: 17/163,999

(22) Filed: Feb. 1, 2021

(65) Prior Publication Data
US 2022/0244534 A1   Aug. 4, 2022

(51) Int. Cl.
G02B 27/01 (2006.01)
B60K 35/00 (2006.01)

(52) U.S. Cl.
CPC .......... *G02B 27/0149* (2013.01); *B60K 35/00* (2013.01); *B60K 2370/1529* (2019.05); *B60K 2370/334* (2019.05); *B60K 2370/691* (2019.05)

(58) Field of Classification Search
CPC .... G03B 21/00–64; B60K 2370/00–98; B60K 35/00; G02B 2027/0105–0198; G02B 27/01–0189
See application file for complete search history.

(56) References Cited

U.S. PATENT DOCUMENTS

2005/0180151 A1*  8/2005  Inayoshi ............... B60K 35/00
                                                    362/488
2017/0269362 A1*  9/2017  Yamasaki .......... G02B 27/0149

FOREIGN PATENT DOCUMENTS

| JP | 2017187528 A | 10/2017 |
| JP | 2018177224 A | 11/2018 |
| JP | 2019043172 A | 3/2019 |
| JP | 6709506 B2 | 6/2020 |
| KR | 200477775 Y1 | 7/2015 |
| WO | 2020048661 A1 | 3/2020 |

* cited by examiner

*Primary Examiner* — Bao-Luan Q Le
*Assistant Examiner* — Christopher A Lamb, II
(74) *Attorney, Agent, or Firm* — Plumsea Law Group, LLC

(57) ABSTRACT

A heads-up display apparatus that includes integrated protection structures is disclosed. The various structures protect the electronics in the heads-up display unit from liquid spills and small objects. The various protective structures are integrated into the heads-up display casing. Namely, the casing may include several drainage structures that channel liquid away from sensitive electronic components in the heads-up display unit. As a result, the heads-up display may be advantageously protected from damage when in use in a motor vehicle dashboard.

20 Claims, 7 Drawing Sheets

HEADS-UP DISPLAY UNIT WITH INTEGRATED PROTECTION SYSTEM

TECHNICAL FIELD

The present disclosure relates to the field of motor vehicle heads-up display systems.

BACKGROUND

Broadly, heads-up display systems are an increasingly common and useful feature in many motor vehicles. Heads-up display systems, also referred to as "HUD" units, may project important information onto the windshield so that a driver may view the information without changing the driver's line of sight. HUD units therefore allow the driver to better concentrate on the road, to better ensure driver and passenger safety while driving. Often, the information is projected in such a manner as to be visible only from the driver's seat. The information displayed may include current speed, the speed limit, blind spot warnings, and turn-by-turn directions. Often, the HUD unit may be integrated into the motor vehicle's dashboard.

However, the location of the HUD unit within the dashboard may present certain disadvantages. For example, the HUD unit may be vulnerable to damage from items that may come into contact with the vehicle dashboard. Namely, some motor vehicle drivers and passengers may occasionally rest liquid beverages on the dashboard. Liquids may therefor spill onto, and into, the HUD unit—causing damage to the projector and other electrical components. The HUD unit may also occasionally be damaged by small personal articles, such as coins, that might fall into the HUD unit after being placed on the dash.

Accordingly, there is a need in the art for improved heads-up displays that addresses these challenges and other shortcomings in the art.

SUMMARY

In one aspect, this disclosure provides a heads-up display apparatus, comprising: a casing, including a lower casing portion and an upper casing portion; the lower casing portion and the upper casing portion together forming a cavity therein that houses a HUD projector within the casing; the upper casing portion including a projection hole therein; a dust cover disposed adjacent to the upper casing portion, the dust cover covering the projection hole in the upper casing portion; the upper casing portion including a top surface having a first lateral side and a second lateral side disposed opposite the first lateral side; the top surface first lateral side including first attachment means for securing the dust cover to the upper casing portion; the top surface second lateral side including second attachment means for securing the dust cover to the upper casing portion; the top surface first lateral side including a first drainage structure configured to channel a liquid from a top surface of the dust cover away from the projection hole in the upper casing portion, such that the liquid does not enter the cavity housing the HUD projector; the top surface second lateral side including a second drainage structure configured to channel a liquid from a top surface of the dust cover away from the projection hole in the upper casing portion, such that the liquid does not enter the cavity housing the HUD projector.

In another aspect, this disclosure provides a motor vehicle containing a heads-up display apparatus comprising: a casing, including a lower casing portion and an upper casing portion; the lower casing portion and the upper casing portion together forming a cavity therein that houses a HUD projector within the casing; the upper casing portion including a projection hole therein; and a dust cover disposed adjacent to the upper casing portion, the dust cover covering the projection hole in the upper casing portion; the upper casing portion including a top surface having a first lateral side, a second lateral side disposed opposite the first lateral side, and front side extending between the first lateral side and the second lateral side; the top surface first lateral side including first attachment means for securing the dust cover to the upper casing portion, and the top surface second lateral side including second attachment means for securing the dust cover to the upper casing portion; wherein each of the top surface first lateral side and the top surface second lateral side includes (a) a drainage canal, each drainage canal being disposed laterally between the respective attachment means and an outer edge of the top surface of the upper casing portion; (b) a sidewall, each sidewall projecting upwards vertically from the top surface of the upper casing portion to a height greater than a height of the attachment means, each sidewall being located laterally between the drainage canal and the outer edge of the top surface of the upper casing portion; and (c) a drainage gutter surrounding each respective attachment means and being connected to the drainage canal; and wherein the top surface front side includes a plurality of rib structures, each rib structure extending upwards vertically to a height above the dust cover adjacent to the top surface front side.

In still another aspect, this disclosure provides a heads-up display apparatus comprising: a casing, including a lower casing portion and an upper casing portion; the lower casing portion and the upper casing portion together forming a cavity therein that houses a HUD projector within the casing; the upper casing portion including a projection hole therein; and a dust cover disposed adjacent to the upper casing portion, the dust cover covering the projection hole in the upper casing portion; the upper casing portion including a top surface having a first lateral side, a second lateral side disposed opposite the first lateral side, and front side extending between the first lateral side and the second lateral side; the top surface first lateral side including first attachment means for securing the dust cover to the upper casing portion, and the top surface second lateral side including second attachment means for securing the dust cover to the upper casing portion; wherein each of the top surface first lateral side and the top surface second lateral side includes a respective sidewall, each sidewall projecting upwards vertically from the top surface of the upper casing portion, each sidewall being located laterally between the respective attachment means and an outer edge of the top surface of the upper casing portion; and wherein the top surface front side includes (a) a plurality of rib structures, each rib structure extending upwards vertically to a height above the dust cover adjacent to the top surface front side; (b) a plurality of drainage through-holes located between each of the plurality of rib structures; (c) a front side flat portion, the dust cover laying contiguous with and parallel to the front side flat portion when attached; and (d) a front side drainage moat, the front side drainage moat being disposed between the front side flat portion and the plurality of rib structures.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Apparatuses for displaying information onto a motor vehicle windshield are described herein. According to the techniques of the example embodiments, the heads-up display apparatus may be used to display relevant information (such as current speed or turn-by-turn directions) into a vehicle driver's line of sight—while also being configured such that the heads-up display apparatus is protected from damage due to liquid spills or small personal items.

Generally, as used herein, a heads-up display apparatus may broadly refer to any device capable of displaying information into a user's light of sight when operating machinery. Motor vehicle heads-up display systems may, in some embodiments, project information onto a vehicle windshield. Heads-up display systems may differ from controls and reads-out on the dashboard of the motor vehicle, which necessarily require the vehicle driver to move their line of sight away from the road. Heads-up displays may therefore help the driver by ensuring uninterrupted and attentive driving.

Figure 1:
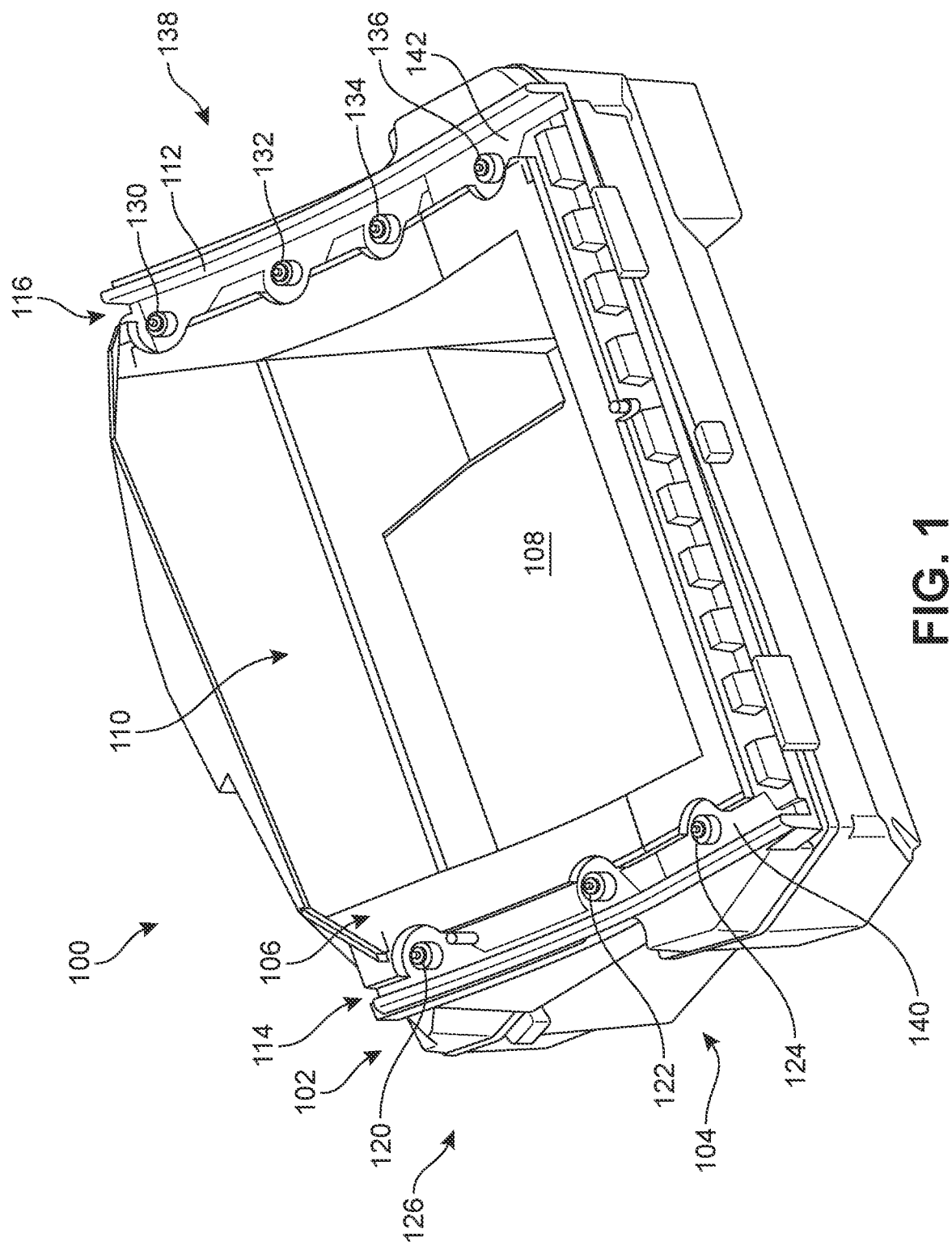
FIG. 1 is an isometric view of a heads-up display apparatus in accordance with this disclosure.

FIG. 1 shows one embodiment of a heads-up display apparatus 100 in accordance with this disclosure. Heads-up display apparatus 100 may include casing 102. Casing 102 may be made up of lower casing portion 104 and upper casing portion 106. Lower casing portion 104 and upper casing portion 106 may be separately manufacturer components that are then assembled together to form casing 100, or they may be integrated continuous portions of a single piece casing.

Together, lower casing portion 104 and upper casing portion 106 may form a cavity 108 within casing 102. Cavity 108 may contain a heads-up display projector (not shown) and other electronic components therein. A heads-up display projector may include a light source, various mirrors and lenses, and related electronic controls. Cavity 108 may house the HUD projector therein, so as to contain the projector within casing 102.

Casing 102 may also include projection hole 110 in upper casing portion 104. Projection hole 110 may allow the HUD projector to project the information onto the windshield, through the projection hole 110 from within cavity 108. Although FIG. 1 shows heads-up display unit 100 without any cover over projection hole 110 in order to best illustrate the relevant features, FIG. 4 and onwards discussed below shows how projection hole 110 may be covered by a dust cover aka HUD lens.

Casing 102 as shown in FIG. 1 also includes features designed to variously protect the heads-up display apparatus 100 from damage that might be sustained while in use in a motor vehicle. Namely, upper casing portion 106 may include a top surface 112. Top surface 112 of upper casing portion 106 may include various structures shaped therein that perform several advantageous functions to protect the heads-up display. These various features, as discussed below, may be integrated shapes and structures that are themselves part of the upper casing portion 106. In this way, the structures that are formed into top surface 112 of upper casing portion 106 may serve to protect the heads-up display, without the need for any further separate components to achieve these ends.

In particular, top surface 112 of upper casing portion 106 may include a first lateral side 114 and a second lateral side 116. Second lateral side 116 may be disposed opposite first lateral side 114. That is, first lateral side 114 and second lateral side 116 may be two opposite sides of top surface 112 of upper casing portion 106. Each lateral side 114, 116 may include several structures related to the operation and protection of the heads-up display apparatus 100.

Namely, each lateral side 114, 116 of top surface 112 may include attachment means for securing the dust cover (not shown in FIG. 1) to the upper casing portion 106. Specifically, top surface first lateral side 114 may include first attachment means 126 for securing the dust cover to upper casing portion 106. Top surface second lateral side 116 may then include second attachment means 138 for securing the dust cover to upper casing portion 106.

More specifically, first attachment means 126 may collectively include first pushpin 120, second pushpin 122, and third pushpin 124. Second attachment means 138 may collectively include fourth pushpin 130, fifth pushpin 132, sixth pushpin 134, and seventh pushpin 136.

However, in other embodiments, first attachment means 126 may be a means for attachment other than a pushpin—such as a screw, latch, or other snap-together attachment structure. Additionally, in other embodiments, first attachment means 126 or second attachment means 138 may include any of a variety of quantities of individual attachment mechanism. For example, first attachment means 126 may, in other embodiments, include two attachment mechanism, or include four attachment mechanisms, or more. Second attachment means 138 may similarly include two individual attachment mechanisms, or three individual attachment mechanisms, or five or more individual attachment mechanisms.

Importantly, top surface 112 of upper casing portion 106 may also include a first drainage structure 140 thereon, located on first lateral side 114. First drainage structure 140 may broadly be any shape of the top surface 112 that is configured to channel a liquid from a top surface of the dust cover (shown in FIG. 6) away from projection hole 110 in upper casing portion 106, such that the liquid does not enter cavity 108 that houses the HUD projector. First drainage structure 140 may be configured such that a liquid flows under the force of gravity away from projection hole 110. First drainage structure 140 may also be configured so as to ensure that liquid that comes into contact with first attachment means 126 does not seep into projection hole 110 or cavity 108. Further details of the features of first drainage structure 140 are discussed variously herein below.

Top surface 112 of upper casing portion 106 may also include a second drainage structure 142 thereon, located on second lateral side 116. As with first drainage structure 140, second drainage structure 142 may generally be any shape of the top surface 112 that is configured to channel a liquid from a stop side of the dust cover (see FIG. 6) away from projection 110, so that any such liquid does not enter cavity 108 where it might damage aspects of the heads-up display. Namely, second drainage structure 142 may also be configured such that a liquid flows down and away from projection hole 110 in response to merely gravitational force. That is, liquid may flow through and along second drainage structure 142 under gravity without being acted upon by any other force. Generally, in some embodiments such as is shown in FIG. 1, first drainage structure 140 and second drainage structure 142 may be substantially symmetric structures. However, in other embodiments not shown, first drainage structure 140 and second drainage structure 142 may differ from each other in one or more ways.

In this way, first drainage structure 140 on first lateral side 114 and second drainage structure 142 on second lateral side 116 may together ensure that any liquid spilled onto a dust cover (see FIGS. 4-6) on the heads-up display unit 100 does not enter cavity 108. In particular, the configuration of first drainage structure 140 and second drainage structure 142 may ensure that each of the attachment means 126, 138 does not allow such a liquid to drain into cavity 108. Therefore, first drainage structure 140 and second drainage structure 142 may be an integrated structure in top surface 112 of upper casing portion 106 that protects the heads-up display from damage.

Figure 2:
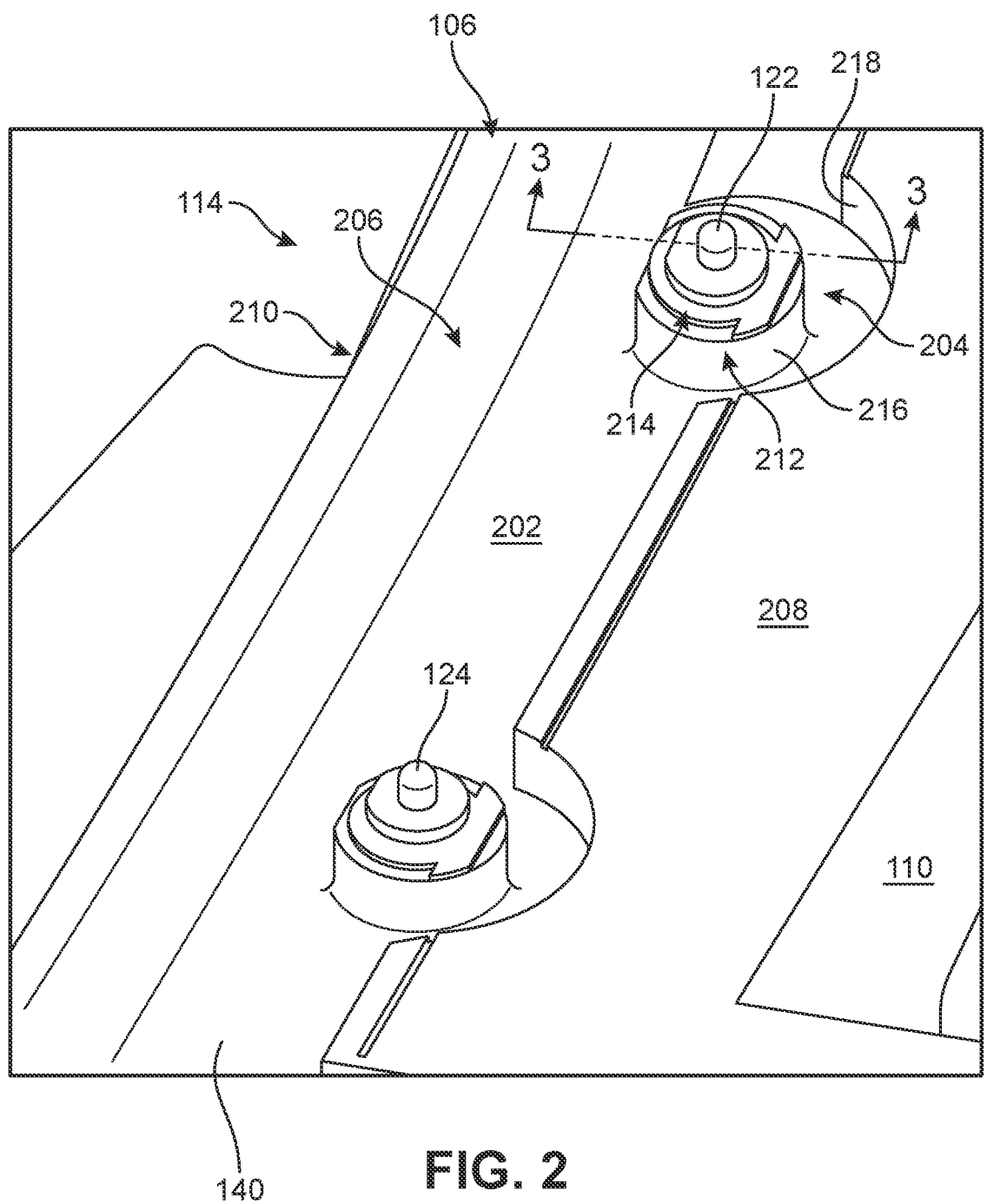
FIG. 2 is an isometric view of a drainage structure on the heads-up display apparatus.

FIG. 2 shows one embodiment of first drainage structure 140 in further detail. FIG. 2 is a zoomed-in isometric view of a portion of first lateral side 106, and a portion of first drainage structure 140 therein. Namely, in this embodiment, first drainage structure 140 may include: drainage canal 202, drainage gutter 204, and sidewall 206.

First, drainage canal 202 may be an area of top surface 112 that is vertically lower than surrounding structures, so as to act as a channel where liquid may be drained out of the heads-up display unit 100. Drainage canal 202 may be located in first lateral side 114 laterally between attachment means 126 and an outer edge 210 of the top surface 112 of the upper casing portion 106. Drainage canal 202 may be disposed laterally outward from projection hole 110, so that projection hole 110 is surrounded on each side by a drainage canal in each of first drainage structure 140 and second drainage structure 142. Accordingly, in some embodiments, each of first drainage structure 140 and second drainage structure 142 may include a drainage canal such as drainage canal 202.

Next, drainage gutter 204 may be an area of top surface 112 that is also vertically lower than surrounding structures on top surface 112, and which surrounds each respective attachment means 122. Namely, drainage gutter 204 may surround a raised area 212, that includes attachment pushpin 122, on at least one side. Raised area 212 may be surrounded by drainage gutter 202 on one side and drainage gutter 204 on the opposite side.

Drainage gutter 204 may be laterally located substantially between projection hole 110 and attachment means 122. Drainage gutter 204 may also be connected to drainage canal 202. Namely, drainage gutter 204 may be continuous with drainage canal 202 around raised area 212. In this way, drainage gutter 204 and drainage canal 202 may collectively allow liquid to drain down from a top side 214 of raised area 212 in any direction. Such a liquid may then be channeled down drainage canal 202 and out of heads-up display unit 100.

Drainage gutter 204 may also be adjacent to a flat portion 208 of first lateral side 114. Flat portion may be adjacent to projection hole 110. Drainage gutter may therefore be defined by side 218 of flat portion 208 and side 216 of raised area 212.

Finally, FIG. 2 also shows sidewall 206 on top surface 112 at first lateral side 114. Sidewall 206 may be a structure that projects vertically upward above features of top surface 112 that are adjacent to sidewall 206. Sidewall 206 may also be laterally located between drainage canal 202 and outer edge 210 of top surface 112 of upper casing portion 106.

Figure 3:
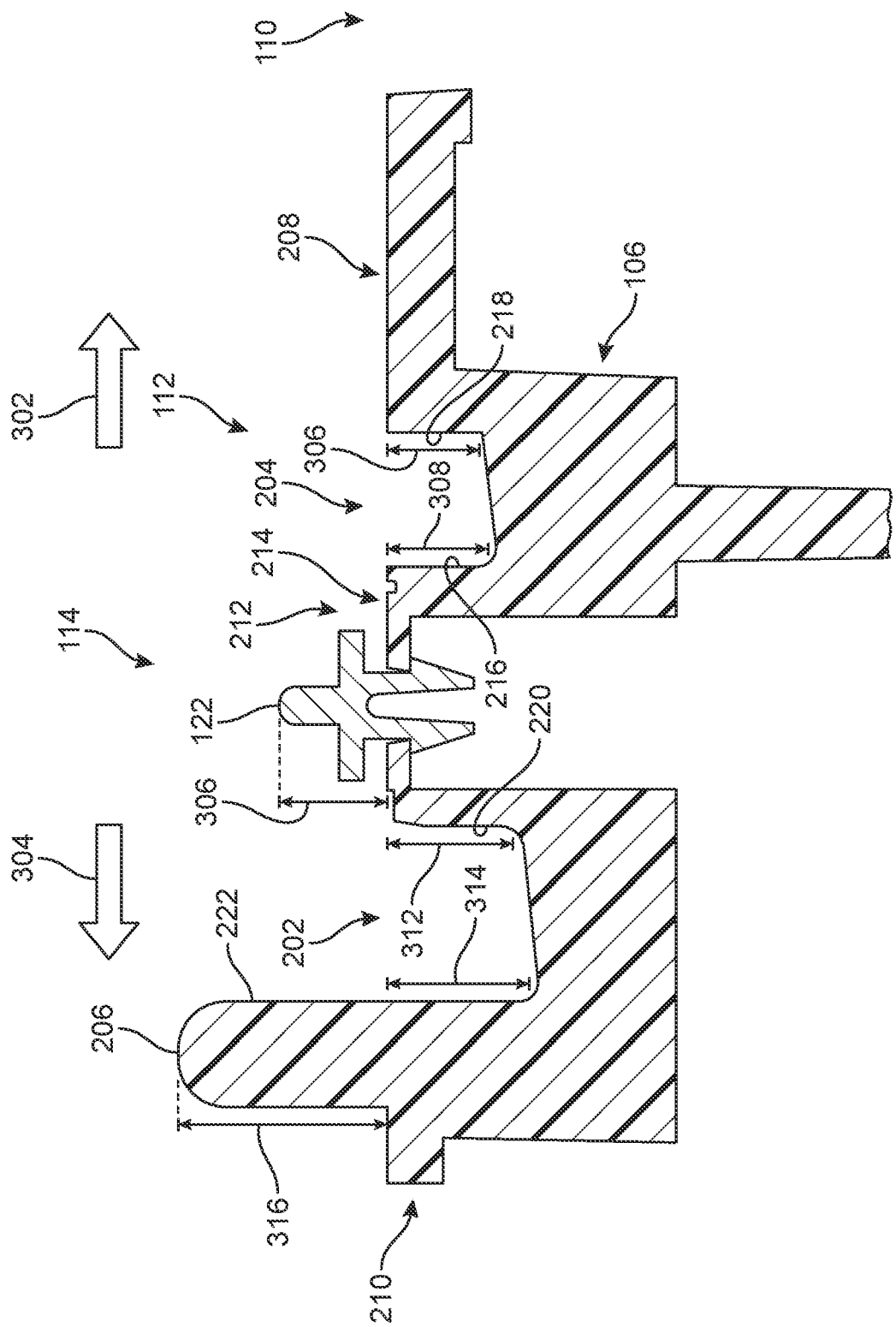
FIG. 3 is a cross-sectional view of a drainage structure on the heads-up display apparatus.

The configuration of one embodiment of drainage canal 20, drainage gutter 204, and sidewall 206 are shown in further detail in FIG. 3.

Namely, FIG. 3 shows a cross-sectional view of attachment means 122 and the surrounding structures on top surface 112, the cross-section being taken where shown in FIG. 2. FIG. 3 is shown so that direction 302 is laterally inward, towards projection hole 110—and direction 304 is laterally outwards, towards outer edge 210 of top surface 112.

As shown in FIG. 3, first lateral side 114 may first include flat portion 208 that is adjacent to projection hole 110. Flat portion 208 may be substantially planar, and may extend laterally from projection hole 100 to drainage gutter 204. Drainage gutter 204 may then be disposed between flat portion 208 and raised area 212, and may extend downward vertically relative to the adjacent structures.

Raised area 212 may include pushpin attachment 122. Pushpin attachment may be used to connect dust cover (see FIGS. 4-6) to the top surface 112 of HUD casing 102 at first lateral side 114. Pushpin 122 may extend through top side 214 of raised area 212, and latch to an underside thereon. Pushpin may also extend vertically upwards when in use to height 306 above top side 214.

Disposed laterally outward 304 from raised area 212 may be drainage canal 202. Although disposed opposite drainage gutter 204 as shown in the cross-sectional view of FIG. 3, drainage canal 202 may nonetheless be connected to drainage gutter 204 as shown in FIG. 2. Generally, drainage canal 202 may be located laterally outwards from attachment means pushpin 122.

Sidewall 206 may next be disposed adjacent to drainage canal 202. Sidewall 206 may therefore be located laterally between drainage canal 202 and edge 210 of top surface 112. Sidewall 206 may extend upward vertically relative to adjacent structures. Namely, sidewall 206 may extend upwards vertically from top surface 112 of upper casing portion 106 to a height 316 that is greater than a height 306 of the attachment means 122. In this way, sidewall 206 may prevent any spilled liquid from sloshing over a lateral edge 210 of top surface 112—but may instead cause a liquid spilled onto the heads-up display unit 100 to be channeled into drainage canal 202, and out of the heads-up display 100. This may allow the liquid drainoff to be controlled and directed as may be necessary for the motor vehicle dashboard into which the heads-up display unit 100 is installed.

FIG. 3 also shows how, in some embodiments, the various depths of the drainage gutter 204 and drainage canal 202 may be configured to cause a spilled liquid to drain laterally outward 304. Namely, drainage gutter 204 may be formed by side 218 of flat portion 208 and side 216 of raised area 212. At side 218, drainage gutter 204 may have a medial depth 306. At side 216, drainage gutter 204 may be have lateral depth 308. Lateral depth 308 may be greater than medial depth 306. As a result of this configuration, liquid that seeps into drainage gutter 204 from raised area 212 may drain under the force of gravity laterally outwards towards the drainage canal 202.

Similarly, drainage canal 202 may be surrounded by side 220 of raised area 212 and side 222 of sidewall 206. At side 220, drainage canal 202 may have medial depth 312 that is larger than drainage gutter lateral depth 308. At side 222, drainage canal 202 may have lateral depth 314. Drainage canal lateral depth 314 may be larger than drainage canal medial depth 312. Accordingly, in this particular embodiment, liquid may flow under the force of gravity laterally outwards to the point it is adjacent to sidewall 206 as it drains out of the heads-up display unit 100 due to the drainage structure 140.

Figure 4:
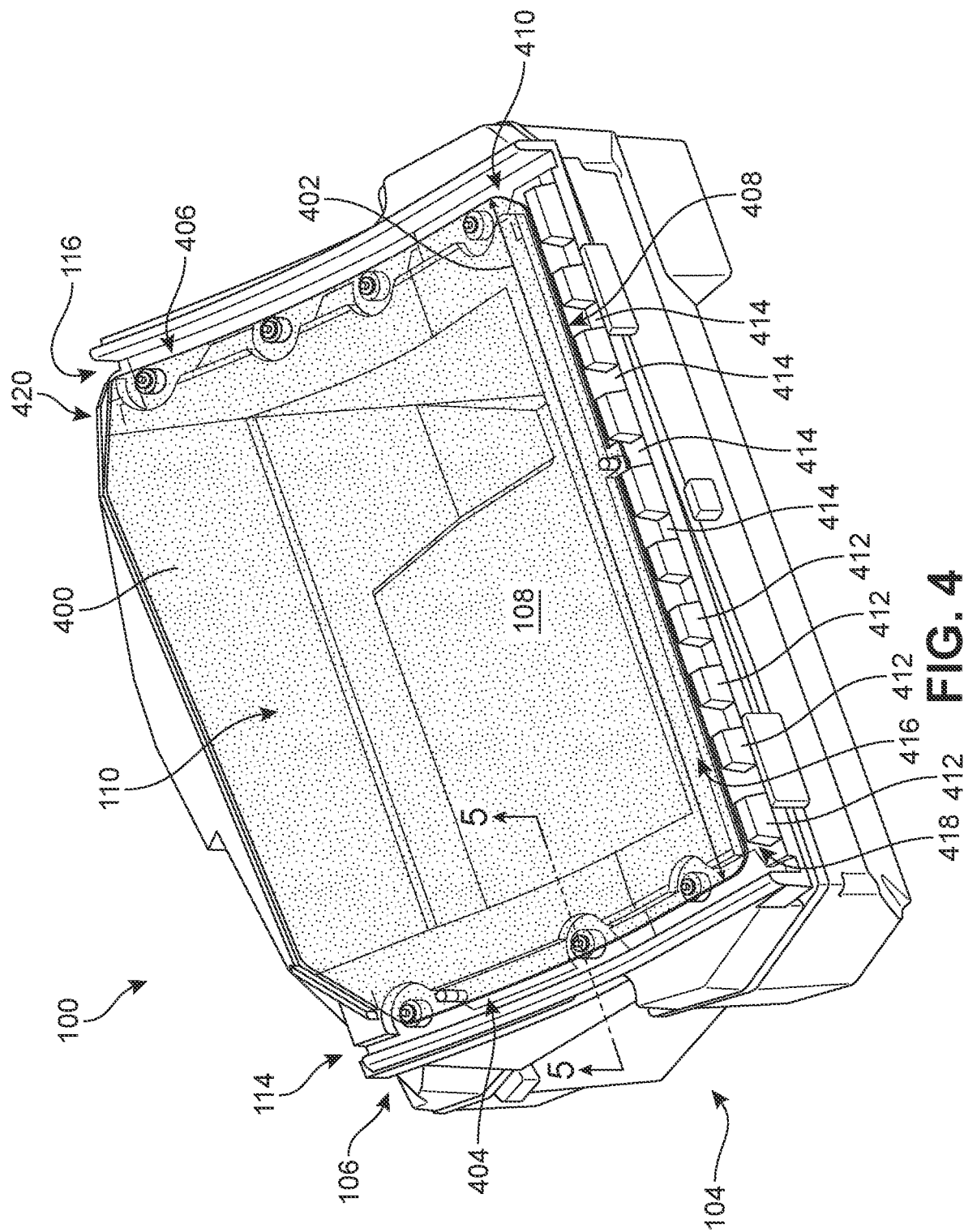
FIG. 4 is an isometric view of a heads-up display apparatus including a dust cover.

FIG. 4 shows the heads-up unit 100 with dust cover 400 thereon. Generally, dust cover 400 may be disposed adjacent to the upper casing portion 106, and may cover projection hole 110. A heads-up display dust cover 400 may sometimes be referred to as the "lens". Dust cover 400 may serve to ensure that dust does not enter projection hole 110 and cavity 108 where HUD projector and other electronic components are housed. Dust cover 400 may be transparent or semi-transparent, so as to allow the HUD projector housed in cavity 108 to project information through the dust cover and onto the motor vehicle windshield.

Dust cover 400 may therefore cover an entirety of projection hole 110 in HUD casing 102. Dust cover 400 may also extend laterally from first side 114 of top surface 112 of upper casing portion 106 to second side 116. Namely, dust cover 400 first edge 404 may be located at first side 114, and dust cover 400 second edge 406 may be located at second side 116, when dust cover 400 is attached to upper casing portion 106. Similarly, in the embodiment shown, dust cover 400 may extend from front edge 410 to rear edge 420 of top surface 112.

FIG. 4 also shows additional features of a particular embodiment of a heads-up display unit 100 having a front edge 410 of top surface 112 that includes a plurality of rib structures 412. Plurality of rib structures 412 may each be separated by one of a plurality of drainage through-holes 414. Plurality of rib structures 412 may extend laterally across front side 410 of top surface 112, from first lateral side 114 to second lateral side 116, so as to be adjacent to a front edge 408 of dust cover 400 along its full width. Plurality of rib structures 412 may serve to catch small personal items dropped onto a motor vehicle dashboard that contains the heads-up display unit 100. Plurality of drainage through-holes 414, between each of the plurality of rib structures 412, may serve to allow liquid drainage.

In particular, front side 410 of top surface 122 may also include a front side flat portion 416 that dust cover 400 rests against. In other words, dust cover 400 may lay contiguous with and parallel to front side flat portion 416 when dust cover 400 is installed on heads-up display unit 100. Front side 410 of top surface 122 may also include a front side drainage moat 418 that is configured to allow liquid to drain out of drainage through-holes 414. Dust cover front edge 408 may extend past front side flat portion 416, so as to create an overhang that overlaps with front side drainage moat 418. Front side drainage moat 418 may be disposed vertically downward from front side flat portion 416, to create this overhang.

Front side drainage moat 418 may be disposed between front side flat portion 416 and plurality of rib structures 412. Front side drainage moat 418 may also be connected to drainage canal 202 on first lateral side 114 and drainage canal on second lateral side 116. Additionally, front side drainage moat 418 may be continuous with plurality of drainage through-holes 414 between the plurality of rib structures 412. As a result, front side drainage moat 418 may allow liquid spilled onto the dust cover to drain down and out of the heads-up display unit 100. Yet at the same time, plurality of rib structures 412 may retain items dropped onto the dust cover for retrieval by a user or driver of the motor vehicle.

Figure 5:
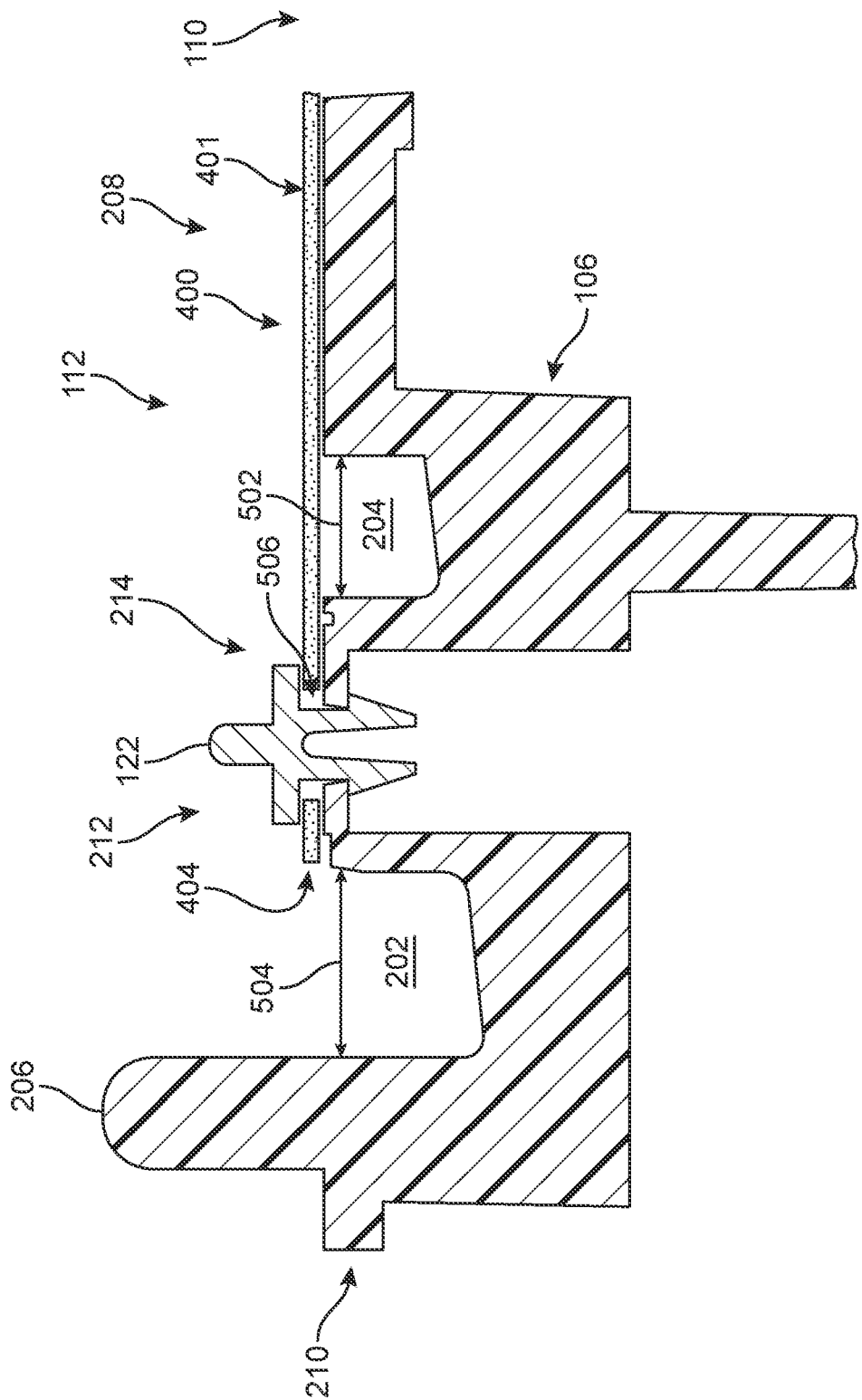
FIG. 5 is a cross-sectional view of the drainage structure on the heads-up display apparatus including the dust cover.

FIG. 5 shows a cross-sectional view of heads-up display unit 100 with dust cover 400 thereon. Namely, FIG. 5 shows the cross-sectional view of attachment means 122 and the surrounding features as indicated in FIG. 4—and as corresponds to FIG. 3 previously discussed above.

Namely, FIG. 5 shows how dust cover 400 may lay contiguous with and parallel to front side flat portion 208. Dust cover 400 then spans across drainage gutter 502, across drainage gutter width 502. Dust cover 400 may then be secured to top surface 112 of upper casing portion 106 by attachment pushpin 122 at raised area 212. As shown in FIG. 5, top side 214 raised area 212 may be substantially planar with flat portion 208—so that dust cover 400 may rest on both when attached.

Dust cover 400 may include hole 506 therein, that allows pushpin attachment means 122 to extend therethrough so as to attached the dust cover 400 to top surface 112 at top side 214 of raised area 212. Due to the presence of hole 506, liquid spilled onto a top surface 401 of dust cover 400 may seep down vertically along pushpin attachment means 122 due to capillary action. Any such liquid would then be drawn down into drainage gutter 204 or drainage canal 202, so that it does not otherwise seep back into projection hole 100. Additionally, dust cover first side edge 404 may be adjacent to drainage canal 202—so that liquid may fall off of edge 404 and downward into drainage canal 202. Raised area 212 and dust cover edge 404 may be separated from sidewall 206 by drainage canal 202 width 504. Accordingly, as a result of these features, drainage gutter 204 and drainage canal 202 may ensure that electronic components housed in cavity 108 of casing 102 are protected from liquid spills made onto the dashboard of a motor vehicle.

Figure 6:
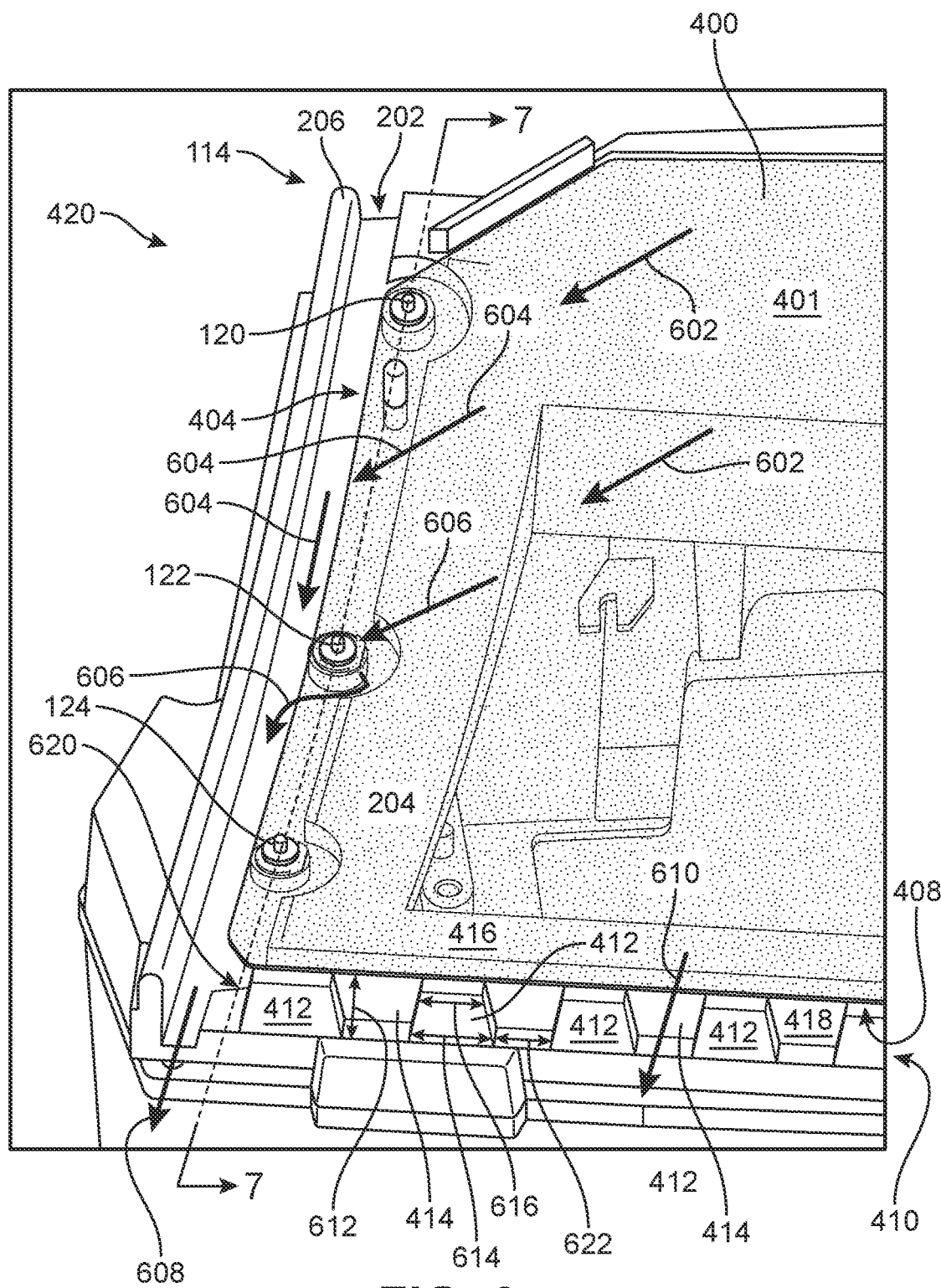
FIG. 6 is an isometric view of the heads-up display apparatus showing how the dust cover, drainage structure, and related components work together to protect the heads-up display from liquid spilled thereon.

FIG. 6 shows the movement of a liquid spilled onto the dust cover 400 in greater detail. Namely, FIG. 6 shows how liquid 602 spilled on dust cover 400 top surface 401 may drain off of dust cover 400 and along top surface 112 of casing 102 so as to exit the heads-up display unit 100 without entering cavity 108. Namely, a liquid 602 (such as water, soda, or other beverage) may be spilled onto dust cover top surface 401 and then drain down along any of several paths off of top surface 112. First, liquid 602 may drain along path 604—off of dust cover edge 404, and into drainage canal 202. Liquid 602 may also drain along path 606—towards attachment means 122, through hole 506 in dust cover 400, onto raised area 212 (as shown in FIG. 5), down into drainage gutter 204, and then along drainage canal 202. Liquid 602 may also drain along path 610—straight down dust cover 400 top surface 401 off of dust cover front edge 408, onto front side drainage moat 418, then out drainage through-holes 414.

Accordingly, heads-up display unit 100 may be protected from liquid spills by the various integrated structures that may be a apart of top surface 112 of upper casing portion 110.

FIG. 6 also shows the plurality of rib structures 412 in greater detail. Specifically, each rib structure 412 may have a height 612. Height 612 may be at least greater than a relative height of the dust cover 400 at edge 408 that is adjacent to rib structure 412. In some embodiments, height 612 may be at least some margin relatively higher a vertical position of dust cover front edge 408 so that plurality of rib structures 412 may "catch" small items dropped onto dust cover 400. Rib structures 412 may also have a base width 614 and a top width 616—and base width 614 may be larger than top width 616. This configuration may allow the plurality of rib structures 412 to easily be molded in an injection molding process, and also further to simultaneously ensure that liquid can drain out through-holes 414 but small solid items are retained on top surface 401 of dust cover 400 or within front side drainage moat 418.

As one example, a passenger or driver of a motor vehicle containing the heads-up display unit 100 may drop their keys, pens, pencils, or coins onto the dashboard where the heads-up display is installed therein. These small personal items may become trapped within the dashboard in the absence of a structure that stops them from slipping down into the dash. Plurality of rib structures 412 therefore ensure that the person may retrieve their small items by reaching onto the dashboard where the heads-up display unit 100 is installed.

Figure 7:
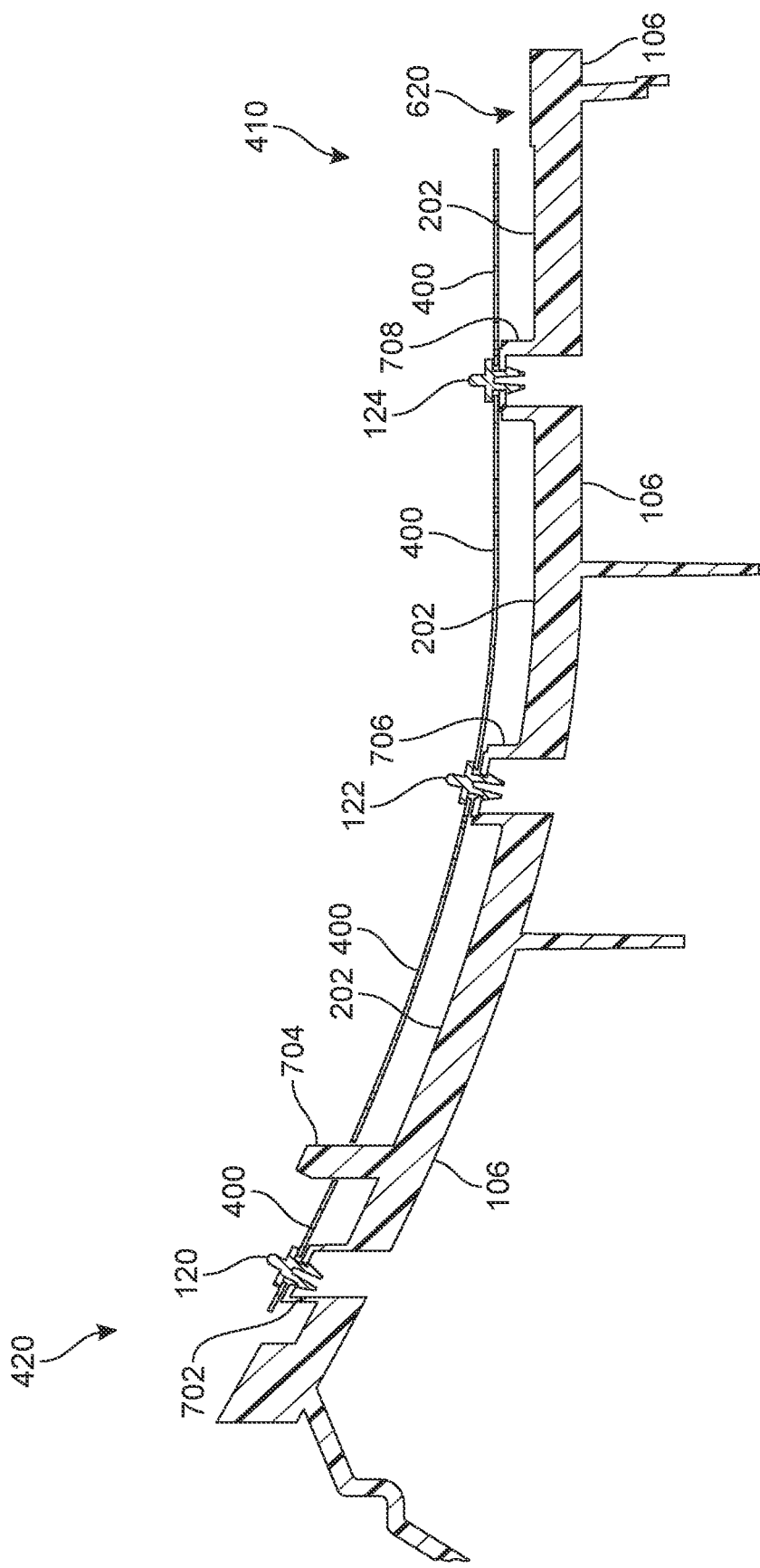
FIG. 7 is a longitudinal cross-sectional view of the drainage structure on the heads-up display apparatus.

FIG. 7 shows a front-to-back cross-sectional view of first lateral side 114 as bisecting each attachment means. The cross-section of FIG. 7 is indicated where shown in FIG. 6. FIG. 7 shows how first attachment pushpin 120 may be connected to first raised area 702 in order to secure dust cover 400 to upper casing portion 106. First attachment pushpin may be located adjacent to rear side 420 of top surface 112. Second attachment pushpin 122 may be located approximately midway between rear side 420 and front side 410 of top surface 112, and may be attached to second raised area 706. Third attachment pushpin 124 may be attached to third raised area 708 adjacent to front side 410 of top surface 112. Accordingly, drainage canal 202 may, in some embodiments as shown, extend front-to-back along substantially an entirety of the top surface 112 lateral side 114 adjacent to the dust cover edge 404.

Additionally, as shown in FIG. 7, first lateral side 114 may also include dust cover alignment post 704 and merging area 620. Merging area 620 may be where drainage canal 202 on first lateral side 114 meets with front drainage moat 418.

As a result of these various structures that are integrated into top surface 112 of upper casing portion 106, heads-up display unit 100 may be protected from liquid spills and small objects—without the need for separate protect devices or apparatuses.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A heads-up display apparatus, comprising:
a casing, including a lower casing portion and an upper casing portion;
the lower casing portion and the upper casing portion together forming a cavity therein that houses a HUD projector within the casing;
the upper casing portion including a projection hole therein;
a dust cover disposed adjacent to the upper casing portion, the dust cover covering the projection hole in the upper casing portion;
the upper casing portion including a top surface having a first lateral side and a second lateral side disposed opposite the first lateral side;
the top surface first lateral side including first attachment means for securing the dust cover to the upper casing portion;
the top surface second lateral side including second attachment means for securing the dust cover to the upper casing portion;
the top surface first lateral side including a first drainage structure configured to channel a liquid from a top surface of the dust cover away from the projection hole in the upper casing portion, such that the liquid does not enter the cavity housing the HUD projector;
the top surface second lateral side including a second drainage structure configured to channel a liquid from a top surface of the dust cover away from the projection hole in the upper casing portion, such that the liquid does not enter the cavity housing the HUD projector.

2. The heads-up display apparatus according to claim 1, wherein each of the first drainage structure and the second drainage structure includes:
a drainage canal disposed laterally between the respective attachment means and an outer edge of the top surface of the upper casing portion.

3. The heads-up display apparatus according to claim 1, wherein each of the first drainage structure and the second drainage structure includes:
a drainage canal disposed laterally between the respective attachment means and an outer edge of the top surface of the upper casing; and
a sidewall projecting upwards vertically from the top surface of the upper casing portion to a height greater than a height of the attachment means;
the sidewall being located laterally between the drainage canal and the outer edge of the top surface of the upper casing portion.

4. The heads-up display apparatus according to claim 1, wherein each of the first drainage structure and the second drainage structure includes:
a drainage canal disposed laterally between the respective attachment means and an outer edge of the top surface of the upper casing; and
a drainage gutter surrounding each of the respective attachment means, the drainage gutter being connected to the drainage canal.

5. The heads-up display apparatus according to claim 1, wherein
each of the top surface first lateral side and the top surface second lateral side include a flat portion, the dust cover laying contiguous with and parallel to the flat portion when attached;
each of the first drainage structure and the second drainage structure includes a drainage gutter located laterally adjacent to the flat portion and surrounding each respective attachment means on at least one side, the drainage gutter extending downward vertically from the flat portion;

each of the respective attachment means connects to the upper casing portion at a raised area of the top surface of the upper housing portion that is surrounded by the drainage gutter, a top side of the raised area being substantially planer with the flat portion such that the dust cover lays on top of the raised area when connected;

each of the first drainage structure and the second drainage structure includes a drainage canal connected to the drainage gutter and disposed laterally between the respective attachment means and a sidewall, the sidewall projecting upwards vertically to a height above the flat portion.

6. The heads-up display apparatus according to claim 1, wherein each of the first drainage structure and the second drainage structure includes:
   a drainage canal disposed laterally between the respective attachment means and an outer edge of the top surface of the upper casing; and
   a drainage gutter surrounding each of the respective attachment means, the drainage gutter being connected to the drainage canal;
   the drainage gutter having a drainage gutter medial depth and a drainage gutter lateral depth, the drainage gutter lateral depth being larger than the drainage gutter medial depth;
   the drainage canal having a drainage canal medial depth that is larger than the drainage gutter lateral depth, the drainage canal also having a drainage canal lateral depth that is larger than the drainage canal medial depth.

7. The heads-up display apparatus according to claim 1, wherein
   the heads-up display apparatus is a component of a motor vehicle.

8. A motor vehicle containing a heads-up display apparatus comprising:
   a casing, including a lower casing portion and an upper casing portion;
   the lower casing portion and the upper casing portion together forming a cavity therein that houses a HUD projector within the casing;
   the upper casing portion including a projection hole therein; and
   a dust cover disposed adjacent to the upper casing portion, the dust cover covering the projection hole in the upper casing portion;
   the upper casing portion including a top surface having a first lateral side, a second lateral side disposed opposite the first lateral side, and front side extending between the first lateral side and the second lateral side;
   the top surface first lateral side including first attachment means for securing the dust cover to the upper casing portion, and the top surface second lateral side including second attachment means for securing the dust cover to the upper casing portion;
   wherein each of the top surface first lateral side and the top surface second lateral side includes
      a drainage canal, each drainage canal being disposed laterally between the respective attachment means and an outer edge of the top surface of the upper casing portion;
      a sidewall, each sidewall projecting upwards vertically from the top surface of the upper casing portion to a height greater than a height of the attachment means, each sidewall being located laterally between the drainage canal and the outer edge of the top surface of the upper casing portion; and
      a drainage gutter surrounding each respective attachment means and being connected to the drainage canal;
   and wherein the top surface front side includes a plurality of rib structures, each rib structure extending upwards vertically to a height above the dust cover adjacent to the top surface front side.

9. The motor vehicle according to claim 8, wherein the top surface front side further includes:
   a front side flat portion, the dust cover laying contiguous with and parallel to the front side flat portion when attached; and
   a front side drainage moat, the front side drainage moat being disposed between the front side flat portion and the plurality of rib structures;
   the front side drainage moat being connected to each of the respective drainage canals.

10. The motor vehicle according to claim 8, wherein the top surface front side further includes a plurality of drainage through-holes located between each of the plurality of rib structures.

11. The motor vehicle according to claim 8, wherein each of the plurality of rib structures has a base width and a top width, the top width being smaller than the base width.

12. The motor vehicle according to claim 8, wherein
   the plurality of rib structures collectively extend laterally across the top surface front side adjacent to a full width of the dust cover.

13. The motor vehicle according to claim 8, wherein
   each respective drainage canal extends front-to-back along the respective top surface lateral side adjacent to the dust cover.

14. A heads-up display apparatus comprising:
   a casing, including a lower casing portion and an upper casing portion;
   the lower casing portion and the upper casing portion together forming a cavity therein that houses a HUD projector within the casing;
   the upper casing portion including a projection hole therein; and
   a dust cover disposed adjacent to the upper casing portion, the dust cover covering the projection hole in the upper casing portion;
   the upper casing portion including a top surface having a first lateral side, a second lateral side disposed opposite the first lateral side, and front side extending between the first lateral side and the second lateral side;
   the top surface first lateral side including first attachment means for securing the dust cover to the upper casing portion, and the top surface second lateral side including second attachment means for securing the dust cover to the upper casing portion;
   wherein each of the top surface first lateral side and the top surface second lateral side includes a respective sidewall, each sidewall projecting upwards vertically from the top surface of the upper casing portion, each sidewall being located laterally between the respective attachment means and an outer edge of the top surface of the upper casing portion;
   and wherein the top surface front side includes
      a plurality of rib structures, each rib structure extending upwards vertically to a height above the dust cover adjacent to the top surface front side;

a plurality of drainage through-holes located between each of the plurality of rib structures;

a front side flat portion, the dust cover laying contiguous with and parallel to the front side flat portion when attached; and a front side drainage moat, the front side drainage moat being disposed between the front side flat portion and the plurality of rib structures.

15. The heads-up display apparatus according to claim 14, wherein each of the top surface first lateral side and the top surface second lateral side further includes a drainage canal disposed laterally between the respective attachment means and the respective sidewall.

16. The heads-up display apparatus according to claim 14, wherein each of the top surface first lateral side and the top surface second lateral side further includes a drainage canal disposed laterally between the respective attachment means and the respective sidewall;

each of the top surface first lateral side and the top surface second lateral side further includes a drainage gutter surrounding each of the respective attachment means, the drainage gutter being connected to the drainage canal;

each respective drainage canal extending front-to-back along the respective top surface lateral side adjacent to a full depth of the dust cover; and the front side drainage moat being connected to each of the respective drainage canals.

17. The heads-up display apparatus according to claim 14, wherein the plurality of rib structures extend laterally across the top surface front side adjacent to a full width of the dust cover; and each of the plurality of rib structures has a base width and a top width, the top width being smaller than the base width.

18. The heads-up display apparatus according to claim 14, wherein each of the respective attachment means connects to the upper casing portion at a raised area of the top surface of the upper housing portion, a top side of the raised area being configured such that the dust cover lays on top of the raised area when connected;

each raised area is surrounded by a drainage gutter; and each drainage gutter is connected to a drainage canal that is disposed laterally between the respective attachment means and the respective sidewall on each of the op surface first lateral side and the top surface second lateral side.

19. The heads-up display apparatus according to claim 14, wherein each of the attachment means is a pushpin that extend through a hole in the dust cover and into the top surface of the upper casing portion.

20. The heads-up display apparatus according to claim 14, wherein the heads-up display apparatus is a component of a motor vehicle.

* * * * *